United States Patent Office 2,786,854
Patented Mar. 26, 1957

2,786,854

PROCESS OF MAKING OXIRANE COMPOUNDS USING HYDROGEN PEROXIDE AND TUNGSTIC ACID AS THE CATALYST

Curtis W. Smith, Berkeley, and George B. Payne, Albany, Calif., assignors to Shell Development Company, Emeryville, Calif., a corporation of Delaware No Drawing. Application June 8, 1953,
Serial No. 360,357

14 Claims. (Cl. 260—348.5)

This invention relates to the production of alpha-epoxy, i. e. oxirane, compounds from ethylenic compounds. It deals with a new method of epoxidizing ethylenic compounds using hydrogen peroxide as the epoxidizing agent.

A great deal of work has been done on the reaction of ethylenic compounds with hydrogen peroxide. As heretofore carried out, especially when using as catalysts metal oxides which easily and reversibly form peracids, the reaction has always resulted in hydroxylation of the ethylenic double bond or bonds. The only recoverable products have been alpha,beta-diols or products of further reaction of such diols. A number of different reaction mechanisms have been proposed in explanation of these results. On the basis of analogy with organic peracids which are known to give isolatable epoxides as initial reaction products with olefins, consideration has been given (see, for example, Mugdan and Young, Journal of the Chemical Society, November 1949, pages 2988–3000 at 2986-7) to the possibility that epoxides are Ephemeral intermediate products in the reaction of hydrogen peroxide with olefins under the catalytic influence of metal oxides which form inorganic peracids. It has not been possible to obtain any direct proof of this mechanism of reaction and other theories of the reaction, particularly explanations in terms of an ionic mechanism, have been generally favored.

To convert ethylenic compounds to oxirane compounds, it has been necessary, as a practical matter, to resort either to reaction with organic peracids or to hypohalogenation followed by reaction with a base. Both of these procedures have disadvantages. The use of organic peracids as epoxidizing agents complicates recovery of the product and gives the best yields only when the peracids are separately prepared under carefully controlled conditions which adds greatly to the cost of the epoxides produced. Production of epoxides via the halohydrin route involves losses in the form of undesirable by-products as well as large investments of capital in equipment for the various steps of the process.

An important object of the present invention is the provision of a new method of producing oxirane compounds. A particular object is the production of such compounds by direct reaction of ethylenic compounds with hydrogen peroxide. A special object, because of the commercial importance of the products, is to produce epoxides having insecticidal properties from polycyclic ethylenic compounds. Still other objects and advantages of the invention will be apparent from the following discussion of the new method.

It has been found that oxirane compounds can be obtained as recoverable products by reacting ethylenic compounds—that is, compounds containing at least one pair of carbon atoms of aliphatic character which are directly linked to each other by a double bond—with hydrogen peroxide in the presence of an inorganic peracid and removing acid substantially completely from the reaction product before subjecting the product to a temperature above 100° C. Apparently the failure to obtain oxirane compounds heretofore in reacting ethylenic compounds with hydrogen peroxide under the catalytic influence of inorganic peracids has been due to the fact that the epoxides initially formed have been converted to other compounds, particularly hydroxylation products, during further reaction and/or in the course of working up the reaction mixture for recovery of the product. By the process of the invention such conversions can be controlled and in some cases even completely suppressed. Complete elimination of the conversion of the initially produced oxirane compound is not essential to the success of the new process, however, since hydroxylation products so obtained are valuable and it may be advantageous to operate with their production as co-products together with the desired oxirane compound or compounds.

The ease with which the initially formed oxirane compound is converted to hydroxylation products and/or further reaction products thereof varies with the nature of the oxirane compound and, hence, the character of the ethylenic compound chosen as starting material. In certain cases the epoxy groups appear to be sterically hindered in a way which imparts greater stability to the compound, while other oxirane compounds are much more sensitive and show a great tendency to epoxide ring opening. These more reactive compounds will, of course, require greater care in handling but in all cases it is feasible to recover the desired oxirane product by proper operation according to the invention.

As previously indicated, the reaction can be satisfactorily carried out under conditions similar to those employed for hydroxylating ethylenic compounds using inorganic peracids as catalysts with the exception that the oxirane compound produced must not be exposed to a temperature above about 100° C. in the presence of the catalyst or of any strong acid, i. e. an acid having a dissociation constant for the first hydrogen at 25° C. above that of acetic acid ($1.86 \times 10^{-5}$). In this connection it is important to note that it is not sufficient merely to remove from the reaction mixture such catalyst as may be present in precipitated or other undissolved form after completion of the reaction. It is also essential that the portion of the catalyst which is in solution in the reacted mixture be removed prior to exposure of the product to undue high temperatures. Thus, when using pertungstic acid as the catalyst, for example, in most instances, and always when aqueous hydrogen peroxide is used, tungstic oxide precipitates from the mixture when the peroxide has completely reacted. It has been proposed that such precipitated catalyst be recovered from the reaction mixture prior to separation of the reaction product therefrom. Such separation has not led to the recovery of any oxirane products from the reaction, however, because some of the catalyst always remains in solution after such separation, and although the amount may be small, it is nevertheless important that it be removed as well as any strong acid present if satisfactory recovery of oxirane products is to be obtained.

Various methods can be used for removing the catalyst or acid components which interfere with recovery of the product as the desired oxirane compound. The best method to use in any particular case will depend on the oxirane compound involved and on the composition of the reaction mixture in which it was prepared, including the nature of the catalyst used. One method which has been found to be generally useful is removal with anion exchange agents. Anion exchange resins have proved especially effective for this purpose. Examples of suitable resins of this kind are those of the phenolic-formaldehyde-polyamine type or those prepared by condensing aliphatic polyamines with polyhalohydrocarbons. Typical commercial anion-exchangers which are satisfactory are, for instance, the American Cyanamid Company products Ionac A-300 and A-293-M, the amine-type resins marketed by The Resinous Products and Chemical Company under the trade names Amberlite IR-4B and IRA-400, phenolic-type resins sold as Duolite 2A by Chemical Process Company, and the like. In using this method of removal it is usually desirable first to remove any suspended catalyst or other material by settling and decantation and/or filtration and then contact the reaction mixture with the chosen anion removal agent. Percolation of the reaction mixture through a column of anion exchange resin or vigorous agitation of the mixture with the resin in finely divided form followed by removal of the resin by filtration settling are suitable methods of achieving the intimate contact of reaction mixture with the anion removal agent required for the substantially complete removal of dissolved catalyst or acid compounds which promote epoxide ring opening.

Neutralization of acidic materials is another method which can be used for removing the undesirable components from reaction products of ethylenic compounds with hydrogen peroxide in the presence of inorganic peracids before exposing the oxirane compound to temperatures greater than 100° C. Still another procedure for accomplishing the same end is extraction with suitable selective solvents. This procedure can often be advantageously combined with neutralization of acidic materials in the mixture. Thus, in the case of water-insoluble oxirane products one can use water washing, with or without basic agents in the wash water, to remove the undesired components. Still other methods of effecting the desired removal of the undesired components can be employed without departing from the invention.

The new method is useful for converting ethylenic compounds of all kinds to oxirane compounds, and the following will be seen to be examples of such compounds having 2 to 18 carbon atoms per molecule, for instance. Mono-ethylenic hydrocarbons which can be so used to produce mono-epoxides are, for example, the olefins such as ethylene, propylene, the normal butylenes, isobutylene, the amylenes, the hexylenes, diisobutylene, the dodecenes, cetene and the like; the cyclic olefins, of which cyclopentene, cyclohexene, the methyl cyclopentenes, the alkyl cyclohexenes such as the methyl cyclohexenes, the ethyl cyclohexenes, the isopropyl cyclohexenes, and the like are typical; and ethylenic aromatic hydrocarbons, examples of which are, for instance, styrene, methyl styrene, vinyl toluene, the phenyl cyclohexenes, and the like. Either mono- or polyepoxy products or mixtures of both can be obtained by the use of open chain or cyclic polyethylenic compounds in the process. Examples of polyolefinic hydrocarbons of these types which can be so used are, for instance, 1,3-butadiene, the pentadienes, the hexadienes, cyclopentadiene, 1,3- and 1,4-cyclohexadiene, the methyl cyclopentadienes, the ethyl cyclohexadienes, the divinyl benzenes, vinyl cyclohexene, isopropenyl cyclohexene, phenyl butadiene, and the like. Substituted ethylenic hydrocarbons, including, for instance, ethylenic halides, ethylenic oxygen-containing compounds such as alcohols, ethers, acids, esters, ketones, and sulfur analogues thereof such as ethylenic mercaptans, thioethers, thio acids and esters, etc., can also be used successfully as starting materials in the new process. Typical examples of suitable ethylenic alcohols include, for instance, allyl alcohol, methyallyl alcohol, crotyl alcohol, allyl carbinol, methyl vinyl carbinol, dimethy allyl carbinol, oleyl alcohol, citronellol, geraniol, linalool, cyclohexenol, the terpineols, cinnamyl alcohol, and related mono- and polyethylenic mono- and poly-hydroxy alcohols. Ethers of the foregoing alcohols which may be the simple ethers or mixed ethers with either saturated or unsaturated alcohols can likewise be epoxidized with advantage by the new process. Typical of these ethers are diallyl ether, ethyl allyl ether, methallyl butyl ether, acrolein acetal, allyl cyclohexyl ether, ethyl oleyl ether, methallyl cinnamyl ether, etc.

Etheylenic carboxylic acids having a desirable low acidity, such as tiglic acid, oleic acid, linoleic, ricinoleic and other drying oil fatty acids, tetrahydrobenzoic acid, cyclohexylidene acetic acid, cinnamic acid, etc., are another class of ethylenic compounds which can be used as starting materials with advantage in the new process. Esters of these acids or other ethylenic acids such as acrylic acid, methacrylic acid, crotonic acid, vinyl acetic acid, sorbic acid and maleic acid with saturated or unsaturated alcohols, or esters of the previously mentioned ethylenic alcohols with carboxylic acids constitute another class of unsaturated compounds which can likewise be used. Examples of suitable esters are, for instance, methyl acrylate, ethyl methacrylate, propyl crotonate, allyl crotonate, allyl acetate, oleyl acetate, cyclohexyl acrylate, diethyl maleate, acrolein diacetate, oleyl cinnamate, ethyl linoleate, and the like. Ethylenic ketones can also be converted to epoxy compounds in accordance with the invention. Carbonyl compounds of this type which can be used in the process are, for example, methyl vinyl ketone, methyl allyl ketone, ethyl isopropenyl ketone, mesityl oxide, phorone, isophorone, methyl cyclohexenyl ketone, vinyl phenyl ketone, benzyl acetone, etc. Ethylenic halides such as allyl chloride, crotyl bromide, methallyl chloride and the like are another type of ethylenic compounds which can be successfully epoxidized as can the mercaptans and thioethers corresponding thereto. Amides, for instance, allyl acetamide, N-methyl oleyamide, N,N'-diallyl oxamide, etc., can also be epoxidized by the new method.

With all these classes of ethylenic starting materials, the preferred compounds are those in which the ethylenic linkage is, or linkages are, between carbon atoms, each of which atoms has its two remaining valences satisfied by single-bonded direct linkages to separate atoms. The preferred ethylenic compounds are also those which contain no other elements than carbon, hydrogen, oxygen, sulfur and halogen (fluorine, chlorine, bromine, or iodine).

The process is especially advantageous for the epoxidation of polycyclic ethylenic compounds which form stable epoxides. Examples of compounds of this type which are particularly useful starting materials because of the value of the products as insecticidal materials are the mono- and di-olefinic fused ring compounds having 5 to 6 carbon atoms in each ring, for instance, 1,4-methano-2,5-cyclohexadiene, hexa- and octa-hydronaphthalenes, 2,3-dichloro-1,4-methano-2,5-cyclohexadiene, 2,3-dichloro - 1,4,4a,5,8,8a - hexahydro - 1,4,5,8 - exo-endo-dimethanonaphthalene, 5,6-dichloro-4,7-methano-3a,4,7,7a-tetrahydroindene, and the like.

Any of the inorganic peracids known to be effective in promoting hydroxylation of ethylenic compounds by hydrogen peroxide can be used successfully as catalysts in the present process. The inorganic peracid catalysts can be formed in situ in the reaction mixture. Thus, acids or metal oxides which react readily with hydrogen peroxide to form peracids which are soluble in the reaction mixture and which are reduced by ethylenic compounds can be used. Peracids of tungsten, vanadium and molybdenum are typical examples of suitable catalysts. These peracids may be used in the form of the simple acids or as polyacids, including various heteropoly acid forms. Heteropolyacids of acid-forming elements of group VI of the periodic table, such as are described in copending application Serial No. 290,329, filed May 27, 1952, are useful catalysts for the preparation of oxirane compounds according to the present invention. Heteropolytungstic acids of arsenic, or antimony, or bismuth are also suitable. Sulfuric acid is also effective as a catalyst for the reaction. While inorganic peracid catalysts derived from metals of groups III through VII of the periodic table can be used, it has been found that the tungstic acids are greatly superior to other catalysts due to their selectivity, i. e. their ability to promote the desired epoxidation with a minimum of undesirable oxidative side reactions. Tungstic acid, the preferred catalyst, also has the advantage of providing high reaction rates.

The hydrogen peroxide used in the reaction can be employed in anhydrous form or as an aqueous solution. Particularly useful are the commercially available aqueous solutions of about 25% to about 60% concentration. The yield of oxirane product is generally highest if the water content of the reaction mixture is kept low, however. Compounds which generate hydrogen peroxide in the reaction mixture can be used instead of hydrogen peroxide in the new process. It is generally desirable to employ the reactants in approximately stoichiometric proportions, i. e. about one mole of hydrogen peroxide per ethylenic linkage which is to be converted to an oxirane group. However, an excess of either reactant can be used, excess hydrogen peroxide, for instance, being useful in order to promote more complete reaction of the ethylenic starting material.

The reaction is preferably carried out in the liquid phase using a solvent capable of dissolving 90% hydrogen peroxide. Non-acidic organic solvents are preferred. Alcohols, hydroxy ethers, ketones and the like are suitable solvents. While any of the alcohols can be used, it is preferred to use alcohols which are less polar than the primary alcohols completely miscible with water. Tertiary alcohols such as tertiary butyl and tertiary amyl alcohols and the like have been found especially useful. Ethylenic alcohols being epoxidized, for instance, allyl alcohol, can serve both as reactant and solvent in the reaction. Suitable hydroxy-ether solvents are, for instance, the ethylene glycol and diethylene glycol monoethers, particularly the ethyl ethers. Dioxane is another solvent which is useful in the process. Ketones, such as acetone and methyl ethyl ketone, are also suitable. Dimethyl formamide and sulfolane are other types of solvents which can be successfully used.

Either atmospheric, superatmospheric or subatmospheric pressure can be used. The preferred temperatures for reaction are of the order of about $-10°$ C. to about $75°$ C., and the time which will be required for completion of the reaction will vary depending upon the temperature chosen. Most preferably, the reaction is carried out at about $40°$ C. to $75°$ C., using the shortest reaction times consistent with adequate conversion of the hydrogen peroxide. Usually reaction times of the order of about 1 to 6 hours are sufficient. Continuous, intermittent or batchwise methods of reaction can be used successfully in carrying out the process.

The following examples further illustrate the invention and show some of the advantages which it provides:

*Example I*

The insecticide "Dieldrin" (1,2,3,4,10,10-hexachloro-6,7-epoxy-1,4,4a,5,6,7,8,8a-octahydro - 1,4,5,8 - endo-exo-dimethanonaphthalene) was produced by reacting "Aldrin" (1,2,3,4,10,10-hexachloro-1,4,4a,5,8,8a-hexahydro-1,4,5,8-endo-exo-dimethanonaphthalene) with 60% aqueous hydrogen peroxide. The reactants, in a ratio of 1.2 moles of hydrogen peroxide per mole of Aldrin, were stirred at $70°$ C. with 20 grams of tungsten trioxide and 1000 grams of tertiary butyl alcohol-water azeotrope (containing about 12% by weight of water) per mole of Aldrin. After six hours' reaction, iodometric titration showed that the stoichiometric amount of hydrogen peroxide (1 mole per mole of Aldrin) had reacted, and after 8 hours the titration for peroxide was unchanged, indicating that little, if any, decomposition of the excess hydrogen peroxide was taking place. The reaction mixture was dumped into about three times its volume of water containing 50% by weight, based on the amount of tungsten trioxide used, of potassium carbonate to dissolve any undissolved tungsten trioxide present. This caused the product to precipitate, and it was collected by filtration, washed thoroughly with water and vacuum dried. The yield of Dieldrin was 98 mole percent based on the Aldrin used and 82 mole percent on the hydrogen peroxide charged. The recovered product gave a mixed melting point with an authentic sample of Dieldrin (M. P. $165°-170°$ C.) of $157°-165°$ C. The epoxide value was 0.25 eq./100 g. compared with the theoretical value of 0.26 eq./100 g.

Distillation of the aqueous tertiary butyl alcohol filtrate from the Dieldrin gave the azotrope for use as solvent in subsequent epoxidation, and acidification of the aqueous bottoms from the distillation precipitates the catalyst which can then be recovered in active form for reuse in the process by filtration.

Dieldrin is produced in the same way, although in a somewhat lower yield, when pervanadic acid is substituted for pertungstic acid in the foregoing procedure.

The reaction was also carried out in methanol solution (2500 ml. per mole of Aldrin) at $50°$ C.–$55°$ C. for 7 hours. The yield of product isolated as above was 93%. Infrared analysis indicated that the product contained 60% by weight of Dieldrin and 40% of Aldrin.

*Example II*

The effect of changes in operation conditions on the epoxidation of Aldrin as carried out in Example I is shown by the following results obtained when using the same method of Dieldrin recovery:

| Run No. | Moles $H_2O_2$ Per Mole Aldrin | Conc. $H_2O_2$ Percent | Weight Percent $WO_3$ Based on Aldrin | Reaction Time (hrs.) | Yield of Dieldrin | |
|---|---|---|---|---|---|---|
| | | | | | Based on Aldrin | Based on $H_2O_2$ |
| 1 | 1.1 | 90 | 0.6 | 9 | 90 | 82 |
| 2 | 1.2 | 34 | 2.7 | 4 | 95 | 79 |
| 3 | 1.1 | 34 | 2.7 | 5 | 95 | 86 |

This method of operation has several advantages over the present commercial method of producing Dieldrin by epoxidation of Aldrin with peracetic acid. The reaction time is greatly reduced and plant capacity practically doubled, consumption of acetic acid is eliminated, which reduces operating costs, and explosion hazards are minimized by use of a one-phase system which avoids the possibility of a detonable aqueous phase.

*Example III*

Using the same method of operation as described in Example I, "Endrin" (1,2,3,4,10,10-hexachloro-6,7-epoxy-1,4,4a,5,6,7,8,8a - octahydro - 1,4,5,6 - endo - endo - dimethanonaphthalene) was produced by reacting "Isodrin" (1,2,3,4,10,10 - hexachloro - 1,4,4a,5,8,8a - hexahydro-1,4,5,6-endo-endo-dimethanonaphthalene) with hydrogen peroxide in a mole ratio of 1.5:1 (peroxide to Isodrin) in the presence of pertungstic acid catalyst. The yield of Endrin was 97% based on Isodrin.

In the same way, "chlordene" (4,5,6,7,8,8-hexachloro-4,7-methano-3a,4,7,7a-tetra hydroindene) which can be produced as the Diels-Alder adduct of hexachlorocyclopentadiene and cyclopentadiene (see U. S. Patent 2,583,569) gives equally good yield of 1,2-epoxy-4,5,6,7,8,8 - hexachloro - 4,7 - methano - 3a,4,7,7a-tetrahydroindane.

*Example IV*

Glycidol was produced by reacting allyl alcohol with 90% hydrogen peroxide using a mole ratio of allyl alcohol to hydrogen peroxide of 50:1. A reaction temperature of 50° C. and 2 grams of tungstic acid per mole of hydrogen peroxide were used in the reaction which was carried on for 3 hours, after which the reaction mixture was percolated through a column of anion exchange resin (Rohm and Haas resin IR–45) which completely removed all the tungstic acid catalyst including that in solution. Distillation of the thus treated mixture resulted in the recovery of glycidol in a yield of 19% based on the hydrogen peroxide charged. The remaining product was glycerol allyl ether (47%) and crude glycerol (15%).

In an identical test in which the reaction mixture was distilled for recovery of products without removing the dissolved catalyst, no glycidol could be detected in the reaction product.

*Example V*

Epichlorohydrin was produced by reacting allyl chloride with 90% hydrogen peroxide in equal molecular proportions in t-butyl alcohol solution at 50° C., using 0.7% pertungstic acid, based on the allyl chloride, as catalyst. The epichlorohydrin was recovered together with monochlorohydrin by distillation of the reaction mixture after removal of the dissolved catalyst by passage of the mixture through a column of the same anion exchange resin as in Example IV. In the same way, epoxy cyclohexane was produced from cyclohexene.

We claim as our invention:

1. A process of producing an oxirane compound which comprises reacting an ethylenic compound having 2 to 27 carbon atoms and not more than two ethylenic double bonds nor more than four rings per molecule of the group consisting of ethylenic hydrocarbons and non-heterocyclic substituted ethylenic hydrocarbons with a substituent of the group consisting of the halogen atoms and hydroxyl, ether, and carboxylic acid ester groups with hydrogen peroxide in a non-acidic solvent in the presence of a peracid catalyst of the group consisting of the peracids of tungsten, vanadium and molybdenum, at a temperature which does not exceed 100° C., removing the catalyst including dissolved catalyst from the reaction mixture without exposing the reaction product to a temperature in excess of 100° C. and recovering said oxirane compound.

2. In a process of reacting an ethylenic compound having 2 to 27 carbon atoms and not more than two ethylenic double bonds nor more than four rings per molecule of the group consisting of ethylenic hydrocarbons and non-heterocyclic substituted ethylenic hydrocarbons with a substituent of the group consisting of the halogen atoms and hydroxyl, ether, and carboxylic acid ester groups with hydrogen peroxide in the presence of an inorganic peracid catalyst of the group consisting of the peracids of tungsten, vanadium and molybdenum, the improvement which comprises carrying out the reaction in a non-acidic organic solvent and maintaining the reaction product at a temperature below 100° C. until the catalyst in solution therewith has been removed therefrom, and recovering an oxirane compound after said catalyst removal.

3. A process in accordance with claim 2 wherein a polycyclic ethylenic compound is reacted with hydrogen peroxide in an aqueous tertiary butyl alcohol solution.

4. A process of producing an oxirane compound which comprises reacting an ethylenic compound having 2 to 27 carbon atoms and not more than two ethylenic double bonds nor more than four rings per molecule of the group consisting of ethylenic hydrocarbons and non-heterocyclic substituted ethylenic hydrocarbons with a substituent of the group consisting of the halogen atoms and hydroxyl, ether, and carboxylic acid ester groups with hydrogen peroxide in a non-acidic solvent in the presence of a pertungstic acid catalyst while maintaining the temperature below 100° C., removing all tungsten compounds from the reacted mixture without exposing the reaction product to a temperature in excess of 100° C., and recovering the oxirane compound produced.

5. A process in accordance with claim 4 wherein a water-soluble ethylenic compound is reacted with hydrogen peroxide in an aqueous medium, and dissolved catalyst is removed from the product by contact with an anion exchange resin.

6. A process of producing a water-insoluble oxirane compound which comprises reacting a water-insoluble ethylenic compound having 2 to 27 carbon atoms and not more than two ethylenic double bonds nor more than four rings per molecule of the group consisting of ethylenic hydrocarbons and non-heterocyclic substituted ethylenic hydrocarbons with a substituent of the group consisting of the halogen atoms and hydroxyl, ether, and carboxylic acid ester groups with hydrogen peroxide in the presence of a non-acidic organic solvent and of pertungstic acid catalyst at a temperature below 100° C. at which said water-insoluble oxirane compound is produced, and water washing said water-insoluble product to extract catalyst therefrom without exposing said product to a temperature in excess of 100° C.

7. A process of producing a hydroxy epoxide-substituted hydrocarbon which comprises reacting at a temperature below 100° C. the corresponding ethylenic alcohol having 3 to 18 carbon atoms and not more than two ethylenic double bonds nor more than four rings per molecule with hydrogen peroxide in a non-acidic solvent in the presence of pertungstic acid catalyst, removing the catalyst from the reacted mixture without permitting the temperature to exceed 100° C. and recovering the hydroxy epoxide product.

8. A process in accordance with claim 7 wherein the catalyst is removed from the reacted mixture with an anion exchange resin.

9. A process of producing glycidol which comprises reacting allyl alcohol with hydrogen peroxide in a non-acidic solvent in the presence of tungstic acid catalyst at a temperature below 100° C., removing the catalyst from the reaction mixture with an ion exchange resin without permitting the temperature to exceed 100° C. and recovering the glycidol.

10. A process of producing a mono-epoxy polycyclic halo-substituted hydrocarbon which comprises reacting an alcohol solution of the corresponding ethylenic polycyclic halo-substituted hydrocarbon having not more than two ethylenic double bonds and as the only rings, not more than four condensed rings of 5 to 6 carbon atoms and not more than 18 carbon atoms per molecule with hydrogen peroxide at a temperature below 100° C. in the presence of an inorganic peracid catalyst of the group consisting of the peracids of tungsten, vanadium and molybdenum, precipitating the epoxy polycyclic compound produced from solution, washing the precipitate with sufficient water to remove the catalyst therefrom, and recovering said epoxy polycyclic compound.

11. A process of producing halo-epoxy-octahydro-1,4,5,8-dimethanonaphthalene which comprises reacting the corresponding halo-hexahydro-1,4,5,8-dimethanonaphthalene with hydrogen peroxide and tungstic oxide catalyst in a non-acidic solvent at a temperature below 100° C., and separating the catalyst from the reaction product without exposing it to a temperature in excess of 100° C.

12. A process in accordance with claim 11 wherein 1,2,3,4,10,10 - hexachloro - 1,4,4a,5,6,7,8,8a - hexahydro-1,4,5,8-dimethanonaphthalene is reacted with hydrogen peroxide.

13. A process of epoxidizing halo-4,7-methanotetrahydroindene which comprises reacting said halo-4,7-methanotetrahydroindene with hydrogen peroxide and tungstic oxide catalyst is a non-acidic solvent at a temperature below 100° C., and separating the catalyst from the reaction product without exposing it to a temperature in excess of 100° C.

14. A process in accordance with claim 13 wherein 4,5,6,7,8,8 - hexachloro - 4,7 - methano - 3a,4,7,7a - tetrahydroindene is reacted with hydrogen peroxide.

References Cited in the file of this patent

UNITED STATES PATENTS

| | | |
|---|---|---|
| 2,312,535 | Fieser | Mar. 2, 1943 |
| 2,543,419 | Niederhausen | Feb. 27, 1951 |
| 2,583,569 | Herzfeld | Jan. 29, 1952 |
| 2,613,223 | Young | Oct. 7, 1952 |
| 2,676,131 | Soloway | Apr. 20, 1954 |
| 2,676,132 | Bluestone | Apr. 20, 1954 |

OTHER REFERENCES

Boeseken et al.: Rec. trav. chim. 52:874–80 (1933) (CA 28:4047[2]).